(12) United States Patent
Mochizuki et al.

(10) Patent No.: US 11,913,804 B2
(45) Date of Patent: Feb. 27, 2024

(54) NETWORK DATA GENERATOR, NETWORK DATA GENERATION METHOD, AND PROGRAM

(71) Applicant: NIPPON TELEGRAPH AND TELEPHONE CORPORATION, Tokyo (JP)

(72) Inventors: Mitsuru Mochizuki, Tokyo (JP); Nobuaki Hiroshima, Tokyo (JP); Osamu Matsuda, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 490 days.

(21) Appl. No.: 16/968,968

(22) PCT Filed: Feb. 13, 2019

(86) PCT No.: PCT/JP2019/005163
§ 371 (c)(1),
(2) Date: Aug. 11, 2020

(87) PCT Pub. No.: WO2019/159987
PCT Pub. Date: Aug. 22, 2019

(65) Prior Publication Data
US 2021/0055125 A1    Feb. 25, 2021

(30) Foreign Application Priority Data
Feb. 13, 2018  (JP) ................ 2018-023227

(51) Int. Cl.
*G01C 21/00* (2006.01)
*G06F 16/22* (2019.01)
(Continued)

(52) U.S. Cl.
CPC ......... *G01C 21/383* (2020.08); *G01C 21/206* (2013.01); *G01C 21/3867* (2020.08); *G06F 16/2228* (2019.01); *G06F 16/29* (2019.01)

(58) Field of Classification Search
CPC ............. G01C 21/383; G01C 21/3867; G01C 21/206; G06F 16/2228; G06F 16/29
See application file for complete search history.

(56) References Cited

U.S. PATENT DOCUMENTS

2015/0285644 A1* 10/2015 Pfaff ................ G01C 21/20
                                                                701/25
2018/0011950 A1*  1/2018 Ishii ................ G06F 30/13

FOREIGN PATENT DOCUMENTS

JP    200883112 A    4/2008
JP    2011-107770 A  6/2011

OTHER PUBLICATIONS

Filippo Mortari, Automatic Extraction of Improved Geometric Network Model From CityGML for Indoor Navigation, Delft University of technology, Nov. 23, 2013 https://3d.bk.tudelft.nl/pdfs/FilippoMortari_thesis.pdf (Year: 2013).*

(Continued)

*Primary Examiner* — Allen S Lin

(57) ABSTRACT

Appropriate network data for an indoor map can be efficiently generated using input data including a structure of an indoor space. In a network data generation device (10) that generates, from the input data including at least the structure of the indoor space and information indicating a property based on the structure of the indoor space, network data, the network data including a link representing a movable space on a map and a node that is a starting point or an ending point of the link, a link/node generation unit (142) generates a set of links and a set of nodes based on the input data.

20 Claims, 15 Drawing Sheets

(51) Int. Cl.
   *G06F 16/29*      (2019.01)
   *G01C 21/20*      (2006.01)

(56) References Cited

OTHER PUBLICATIONS

Mortari Filippo, "Automatic Extraction of Improved Geometrical Network Model from City GML for Indoor Navigation," Nov. 23, 2013, University of L'Aquila.

* cited by examiner

NETWORK DATA GENERATOR, NETWORK DATA GENERATION METHOD, AND PROGRAM

CROSS-REFERENCE TO RELATED APPLICATIONS

This application is a U.S. 371 Application of International Patent Application No. PCT/JP2019/005163, filed on 13 Feb. 2019, which application claims priority to and the benefit of JP Application No. 2018-023227, filed on 13 Feb. 2018, the disclosures of which are hereby incorporated herein by reference in their entireties.

TECHNICAL FIELD

The present disclosure relates to a network data generation device, a network data generation method, and a program, and particularly to a network data generation device, a network data generation method, and a program, capable of automatically generating network data sufficient for route search.

BACKGROUND ART

In the related art, there is a technology of automatically generating 2D and 3D network data from an indoor 3D digital model for indoor navigation (Non-Patent Literature 1).

CITATION LIST

Non Patent Literature

Non-Patent Literature 1: "Automatic Extraction of Improved Geometrical Network Model from CityGML for Indoor navigation" <Internet search: https://3d.bk.tudelft.nl/pdfs/FilippoMortari_thesis.pdf Search date: 2017 Nov. 14>

SUMMARY OF THE INVENTION

Technical Problem

However, in Non-Patent Literature 1, in a case where an indoor space (for example, a room or a toilet) in which the indoor space is closed by an entrance or the like, data is required to be appended and corrected to connect pieces of generated network data to each other.

When route search or navigation is performed, attribute information such as a space (a width, a depth, a height, and a floor material or the like), an entrance (a width, a height, a step or the like) and a staircase (the number of steps, a height of a step, and presence or absence of a handrail) is useful information but unless the attribute information is allocated beforehand when network data is generated, the attribute information is required to be associated with the network data later.

Furthermore, an indoor space typically has floors and thus pieces of network data for connection of upper and lower floors is also required to be separately associated with each other.

In a case where Delaunay triangulation is performed to a shape of an indoor walkable region, as a shape of an indoor space becomes complex, unnecessary nodes as data indicating that a moving object is movable tend to be more excessively generated, and thus a longer time is required to generate the network data, which is also problematic.

The present disclosure has been made in light of the problem described above, and an object thereof is to provide a network data generation device, a network data generation method, and a program, capable of efficiently generating appropriate network data for an indoor map from input data including a structure of an indoor space.

Means for Solving the Problem

The present disclosure provides, a network data generation device for generating, from input data including at least a structure of an indoor space and information indicating a property based on the structure of the indoor space, network data including a link representing a space where a moving object can move on a map and a node serving as a starting point or an ending point of the link, the network data generation device including a determination unit configured to determine whether a target space that is a partial region of the indoor space is a room or a passage; and a link/node generation unit configured to generate a set of links and a set of nodes, based on a determination result from the determination unit.

According to the present disclosure, a network data generation method for a network data generation device that generates, from input data including at least a structure of an indoor space and information indicating a property based on the structure of the indoor space, network data including a link representing a space where a moving object can move on a map and a node serving as a starting point or an ending point of the link, the network data generation method including determining, by a determination unit, whether a target space that is a partial region of the indoor space is a room or a passage; and generating, by a link/node generation unit, a set of links and a set of nodes based on a determination result from the determination unit.

According to the network data generation device and the network data generation method of the present disclosure, the determination unit determines, from input data including at least a structure of the indoor space and information indicating a property based on the structure of the indoor space, whether the target space that is a partial region of an indoor space is a room or a passage, and the link/node generation unit generates a set of links and a set of nodes based on a determination result from the determination unit, and generates network data including a link representing a space where a moving object can move on a map and a node that is a starting point or an ending point of the link.

As mentioned above, by determining, with respect to input data including at least a structure of the indoor space and information indicating a property based on the structure of the indoor space, whether a target space that is a partial region of an indoor space is a room or a passage, and by generating a set of links and a set of nodes based on a determination result, appropriate network data for an indoor map can be efficiently generated from the input data including the structure of the indoor space.

In the network data generation device according to the present disclosure, the link/node generation unit may generate whether the target space can be configured of only a node or required to be configured of a link and a node based on a characteristic of the target space defined according to the structure of the indoor space.

In the network data generation device according to the present disclosure, the characteristic may be at least one of:

the number of entrances; and visibility/invisibility of substantially all regions in the target space from any position in the target space.

In the network data generation device according to the present disclosure, the link/node generation unit, in a case where a shape of the target space is a convex polygon, may determine that substantially all regions in the target space are visible from any position in the target space, and may determine that the target space can be configured of only a node.

In the network data generation device according to the present disclosure, the link/node generation unit may simplify a shape of the target space such that the number of vertices is reduced, and may determine whether the shape of the target space is a convex polygon based on a simplified shape of the target space.

The network data generation device according to the present disclosure may further include a connection unit configured to connect at least a generated set of nodes and a generated set of links based on information corresponding to an entrance.

In the network data generation device according to the present disclosure, the information indicating the property may include direct property information with which whether the target space is represented by a link or a node can be directly determined, and indirect property information with which whether the target space is represented by a link or a node is acquired through analysis.

A program according to the present disclosure is the program for causing a computer to function as each unit of the network data generation device.

Effects of the Invention

According to a network data generation device, a network data generation method, and a program of the present disclosure, appropriate network data for an indoor map can be efficiently generated from input data including a structure of an indoor space.

DESCRIPTION OF EMBODIMENTS

Figure 1:
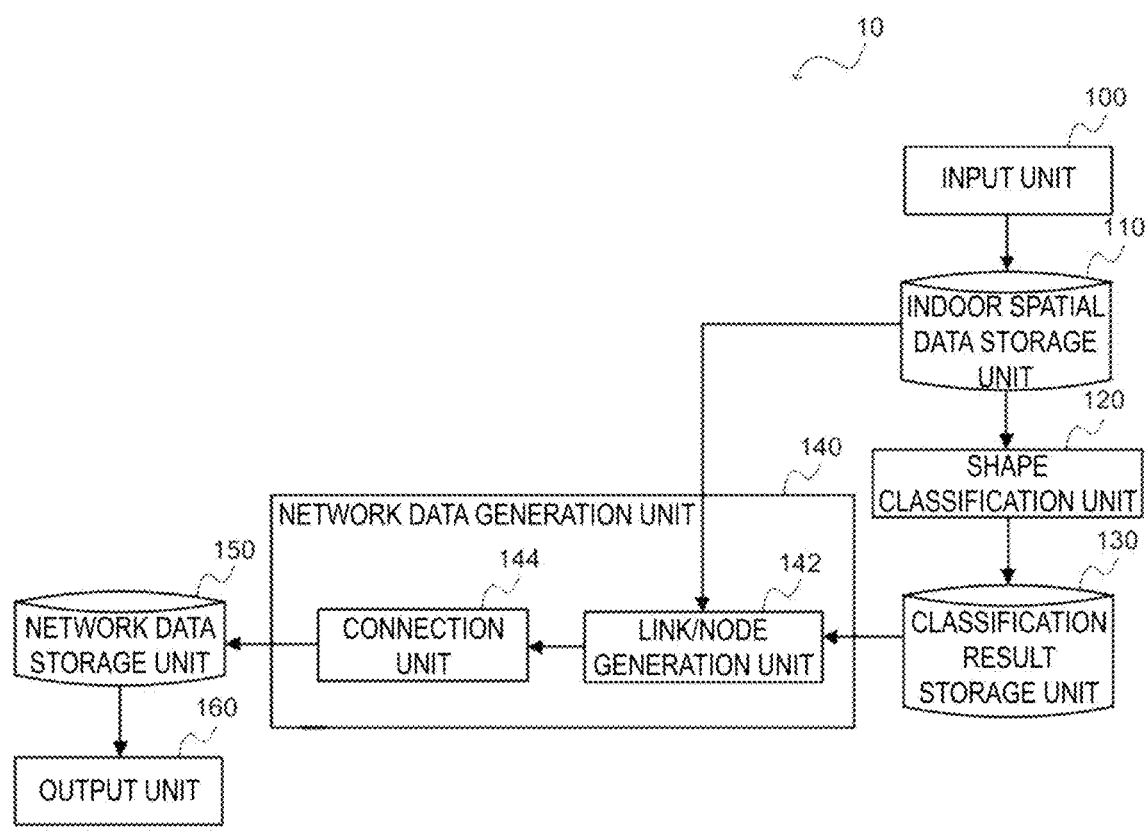
FIG. 1 is a block diagram illustrating a configuration of a network data generation device according to an embodiment of the present disclosure.
Figure 2:
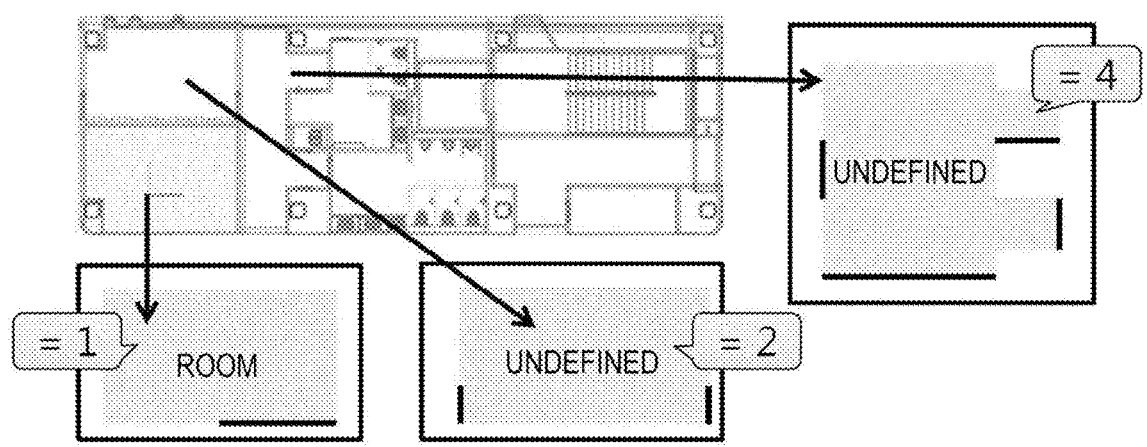
FIG. 2 is an image diagram illustrating an example (focusing on the number of entrances) of classifying "spaces" according to the embodiment of the present disclosure.

Hereinafter, an embodiment of the present disclosure will be described with reference to the drawings.

Overview of Network Data Generation Device
According to Embodiment of Present Disclosure First, an overview of an embodiment of the present disclosure will be described.

In the present embodiment, respective target spaces, i.e., parts of an indoor space are classified as a "room", a "passage", an "entrance", or a "floor connection" for each "floor" from input data, and network data for the indoor space is automatically generated.

Classification

In a case where target spaces can be classified according to definition of a class or a layer of the input data, or a name or attribute information appended to a shape, the target spaces are classified as a "room", a "passage", an "entrance", or a "floor connection" for each "floor".

Here, the "room" is a "space" that may be a navigation point as a destination, and the "passage" is a "space" for moving between a "room" and a "room".

The "entrance" is a location (a door or an opening) that connects a "space" and a "space" to each other, and the "floor connection" is a location (a staircase, an elevator, an escalator or the like) that connects floors in the indoor space to each other.

Next, a "space" (which was unable to be determined as a room or a passage) among the target spaces that are not classified according to a class or the like, is classified as a "room" when the number of "entrances" connected to the "space" is one, or when the space has a shape in which the entire target space is visible from a predetermined position in the target space. The shape may include, for example, a convex polygon. The "space" is the minimum unit configuring a region where a moving object can move in the indoor space, and includes, for example, a "room" or a "passage".

Among the target spaces, a "space" is classified as a "passage" when the number of "entrances" connected to the "space" is two or more, and when the space has a shape in which the entire target space is not visible from a predetermined position in the target space. The shape may include, for example, a concave or perforated (with holes) polygon. The reason why the number of "entrances" connected to a "space" has an absolute value of 2 as a boundary is that a possibility of the other "entrance" not being visible from one "entrance" occurs when the number of entrances is two or more. For example, in a case where a space is relatively determined to be a "passage" by a ratio between the total number of "entrances" in an indoor space and the number of "entrances" connected to the target "space", when the total number is too large, in the above example (there are two "entrances", and the "entrances" are not visible from each other's positions), the space is determined to be a "room", and thus the "entrances" cannot be connected to each other.

In the above case, in a case where a shape of the "space" is complex, the shape is simplified (the number of vertex coordinates is reduced) and classified whether a "room" or a "passage" based on a characteristic of the shape, and then network data for the indoor space is automatically generated.

In the above case, when input data is a 3D model such as BIM data, because a shape has accurate height or position information, a shape not being an obstacle for movement such as a suspended wall which can be passed by a moving object present inside of the shape of a "space" is removed in advance, and then indoor space network data is automatically generated.

Network Data Generation

Network data in a "room" is automatically generated by generating nodes in the vicinity of an "entrance" that is connected to the "room" and connecting the nodes to each other via a link when the number of nodes is two or more.

Here, the link is a line drawn to a movable region such as a building's corridor, indicating that a moving object (a person, a wheelchair, a stroller, a robot, a drone or the like) can move on the link. Both ends of a link are necessarily nodes, and a link has only a set of pieces of attribute information such as a direction and a length. Thus, in a case where the link bifurcate in the middle of a link, or changes a direction thereof, a node is provided at a point serving as a starting point to divide the link.

The node is a point serving as a starting point or an ending point of a link. In addition to a case where a node is generated in the event of changing a direction of a link (a curve is created) or branching the link, a link may be divided by intentionally adding a node in the middle of the link in a case where a navigation point is desired to be provided nearest a ground object such as a store.

Network data in a "passage" is automatically generated by generating centerlines for a shape of the passage, generating nodes at vertices and intersections thereof, and connecting the nodes to each other via a link.

By connecting nodes between "spaces" and between "floors" respectively, data with a high degree of accuracy is automatically generated as an indoor space network.

When network data is generated, data having higher utility can be efficiently automatically generated by appending attribute information in input data thereto.

Here, the attribute information in the input data includes information that is directly included as attribute information in a "room", a "passage", an "entrance", and a "floor connection", and information that is not directly included but acquired by automatically extracting a shape in the vicinity or inside a shape thereof (for example, a handrail in a staircase or the number of toilet bowls in a toilet) or attribute information thereof (for example, a material of a floor surface in a space).

In a case where identical attribute information is appended to a plurality of pieces of network data when attribute information is appended, a data amount can be reduced by separately generating a POI and appending an ID thereof to the attribute information. Here, the POI stands for a point of interest, and is used to manage a representative point and attribute of a shape of a space (a store, a room, a toilet or the like). Here, the representative point is any point that is easy to understand on a shape of a space and may use, for example, a centroid point.

Therefore, compared with the technology of the related art, indoor space network data that is useful and has a high degree of accuracy in performing route search can be automatically generated as the minimum data required for movement in a space while suppressing implementation of correction or manual modification after automatic generation.

Configuration of Network Data Generation Device According to Embodiment of Present Disclosure A configuration of a network data generation device 10 according to an embodiment of the present disclosure will be described with reference to FIG. 1. FIG. 1 is a block diagram illustrating a configuration of the network data generation device 10 according to the embodiment of the present disclosure.

The network data generation device 10 is configured with a computer including a CPU, a RAM, and a ROM storing a program for executing a shape classification processing routine and a network data generation processing routine, which will be described below, and is functionally configured as follows.

The network data generation device 10 is configured to include an input unit 100, an indoor spatial data storage unit 110, a shape classification unit 120, a classification result storage unit 130, a network data generation unit 140, a network data storage unit 150, and an output unit 160.

The input unit 100 receives input of input data including at least a structure of an indoor space and information indicating a property based on the structure of the indoor space. The information indicating the property includes direct property information with which whether a space is represented by a link or a node can be directly determined, and indirect property information with which whether the space is represented by a link or a node is acquired through analysis.

As the input data, digital design diagrams used in architecture, for example, digital vector data such as architectural CAD data of 2D created during architectural design or 3D models included in BIM data is used. When the BIM is used, a result of horizontal projection for each floor may be handled as 2D vector data.

The input data includes a shape such as a room, a passage, an entrance, a staircase, or an elevator, with these shapes having been associated with definitions for a layer or a class in terms of meaning thereof in advance.

The indoor spatial data storage unit 110 stores input data received by the input unit 100.

The shape classification unit 120 classifies a shape type of each target space as a "room", a "passage", an "entrance", or a "floor connection" based on the input data. As a method of classifying the shape type, for example, at least one is applied among the following determination methods.

Determination Method 1

A shape type of each target space is determined on the basis of definition information of a layer or a class in the input data. For example, in architectural CAD, typically, not only walls or corridors but also pillars, stores, toilets, and escalators may be managed individually according to layers, and thus the shape type of each target space is determined on the basis of such layer definition. For example, in Industry Foundation Classes (IFC) that is one format of BIM data, a class is defined for each structure such as a floor, a space, a staircase, a door, and a pillar, and thus the shape type of each target space is determined on the basis of such class definition. The definition information of a layer or a class in the input data is an example of the direct property information with which whether a space is represented by a link or a node can be directly determined.

Determination Method 2

A shape type of each target space is determined on the basis of a name appended to each shape in the input data. For example, a determination is performed on the basis of wording included in names such as "xxx room", "xxx passage", "xxx emergency exit", or "xxx staircase". The name appended to each shape in the input data is an example of the direct property information with which whether a space is represented by a link or a node can be directly determined.

Determination Method 3

A shape type of each target space is determined on the basis of attribute information of each shape in the input data. For example, a determination is performed on the basis of attribute information such as the number of steps or an opening. The attribute information of each shape in the input data is an example of the indirect property information with which whether a space is represented by a link or a node is acquired through analysis.

Determination Method 4

Information indicating a "room", a "passage", an "entrance", or a "floor connection" is appended to the input data in advance, and a determination is performed on the basis of the information. The information indicating a "room", a "passage", an "entrance", or a "floor connection" is an example of the direct property information with which whether a space is represented by a link or a node can be directly determined.

Here, for example, in a case where the input data is BIM, a "room" and a "passage" are managed in the same class definition information "space" and thus cannot be determined in the determination method 1. In the determination method 2 or the determination method 3, in a case where a naming rule is not specified (due to naming variation depending on data creators (designers)), the "room" and the "passage" cannot be determined. The determination method 4 is effective in a case where the number of "spaces" in the input data is not many, but is reduced in efficiency as the number thereof increases.

Therefore, the shape classification unit 120 classifies a shape type of each target space as a "room," a "passage," an "entrance," or a "floor connection" based on a characteristic of the target space that is a partial region of a space and is defined according to a structure of the space. Here, the characteristic is at least one of: the number of entrances; and visibility/invisibility of substantially all regions in a target space from any position in the target space.

Specifically, the shape classification unit 120 determines a target space as being a "room" in a case where a shape of the target space is a convex polygon, and determines the target space as being a "passage" in a case where the shape of the target space is a concave or perforated polygon.

For example, the shape classification unit 120 uses the following determination method 5.

Determination Method 5

In a case where a shape type of each target space cannot be determined whether a "room" or a "passage", such a "space" for which the determination is impossible is determined whether the "room" or the "passage" based on features of each the shapes.

First, the shape classification unit 120 focuses on the number (characteristic) of "entrances" connected to a "space", and determines the shape type of a "space" as being a "room" in a case where the number of "entrances" is one (the number of entrances=1).

On the other hand, in a case where the number of "entrances" is greater than one (the number of entrances>1), it is determined whether the space is a "room" or a "passage" based on information such as a shape, a width, and a depth of the "space".

As a determination method based on information such as a shape in the input data, for example, a shape of the "space" is focused, and, in a case where the shape is a convex polygon, the shape is determined to be a "room", and, in a case where the shape is a concave or perforated (with holes) polygon, the shape is determined to be a "passage".

Figure 3:
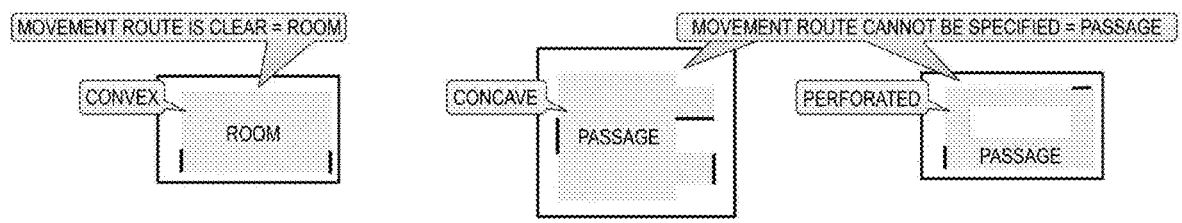
FIG. 3 is an image diagram illustrating an example (focusing on a shape) of classifying "spaces" according to the embodiment of the present disclosure.

This is because, in a case where the entire space is not visible from a spot in the "space" (for example, the other entrance is not viewed from one entrance) due to a shape of the "space", there is a probability that a destination spot or a relay spot to which a moving object desires to move may not come into view. An example of such a shape may be a concave polygon or a perforated polygon illustrated in FIG. 3.

In a case of a convex polygon, because there is no obstruction such as a wall in a direction from any spot in the "space" to its centroid, when a moving object reaches an "entrance", a destination spot or a relay spot to which the moving object desires to move is clear ("the space itself is a destination" or other "entrances" that are present in the "space" are passing spots). Therefore, network data can be generated at this point.

In a case of a concave or perforated polygon, other "entrances" (relay spots) present in the "space" may not come into view due to an obstacle such as a wall. Therefore, network data cannot be generated in this state. Thus, it is determined to be a "passage".

When it is determined whether a shape of a target space is a convex polygon or a concave or perforated polygon, the shape classification unit 120 may simplify the shape of the target space such that the number of vertices is reduced, and may determine whether the shape of the target space is a convex polygon or a concave or perforated polygon based on a simplified shape of the target space.

When the shape classification unit 120 determines a shape type focusing on a shape, in a case where the shape of a space in the input data is complex (there is a small gap with an outer frame or a small hole in the space), the shape of the space cannot be simply determined to be a concave, convex, or perforated polygon. Thus, it is preferable to perform a determination of a concave, convex, or perforated polygon after simplifying the complex shape (reducing the number of vertex coordinates).

Figure 4:
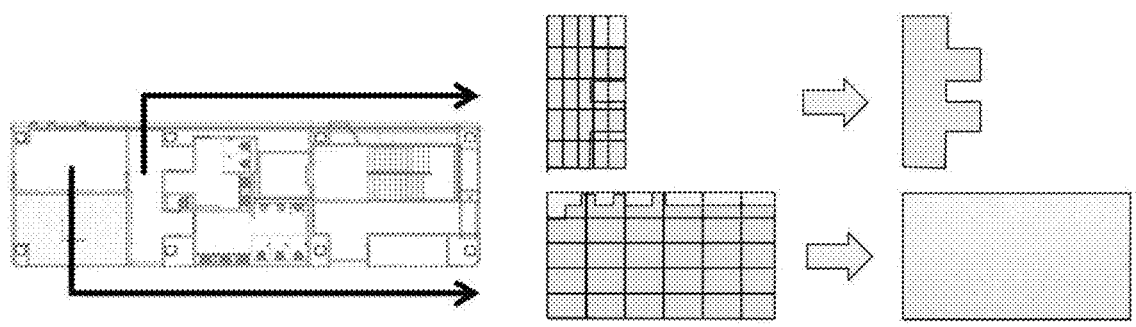
FIG. 4 is an image diagram illustrating an example (grid simplification) of simplifying a spatial shape according to the embodiment of the present disclosure.
Figure 5:
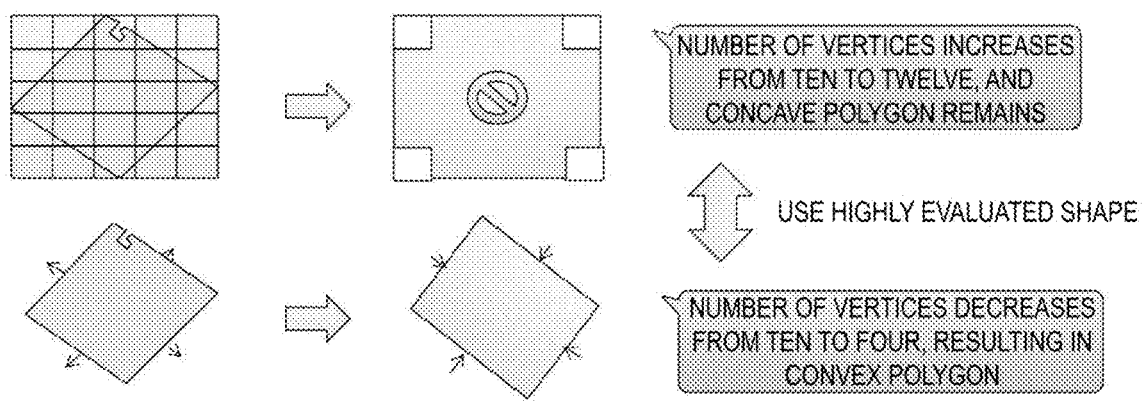
FIG. 5 is an image diagram illustrating an example (buffer simplification) of simplifying a spatial shape according to the embodiment of the present disclosure.

There may be various methods of simplifying a spatial shape, and simplification using a grid or a buffer may be used as an example of simplification thereof. Examples of simplification are illustrated in FIG. 4 and FIG. 5.

In simplification using a grid (FIG. 4), the simplification based on a characteristic in the input data is considered. Because the input data is design data used in architecture, a shape of a space is fundamentally horizontal and vertical. Therefore, a rectangle circumscribed to a shape of a space is divided into small grids that are horizontal and vertical (as a reference, a height and a width of the grid are set to ½ of the minimum passage width in a building such that the grid has a size sufficient for a moving object to be able to move). A set of grids in which the grids and the shape of the space overlap each other is used as a shape of the space after simplification, and thus it is possible to simplify the shape of the space.

However, simplification using a grid may result in an adverse effect. In that case, simplification using buffer is considered.

In simplification using a buffer (FIG. 5), a shape of a space may be simplified by generating a buffer (as a reference, a height and a width of the grid are set to ½ of the minimum passage width in a building such that the grid has a size sufficient for a moving object to be able to move) that expands the shape with respect to the shape of the space, and then by generating a buffer that contracts (at the same value as that of the expanding buffer) a shape resulting from the expanding buffer.

Figure 6:
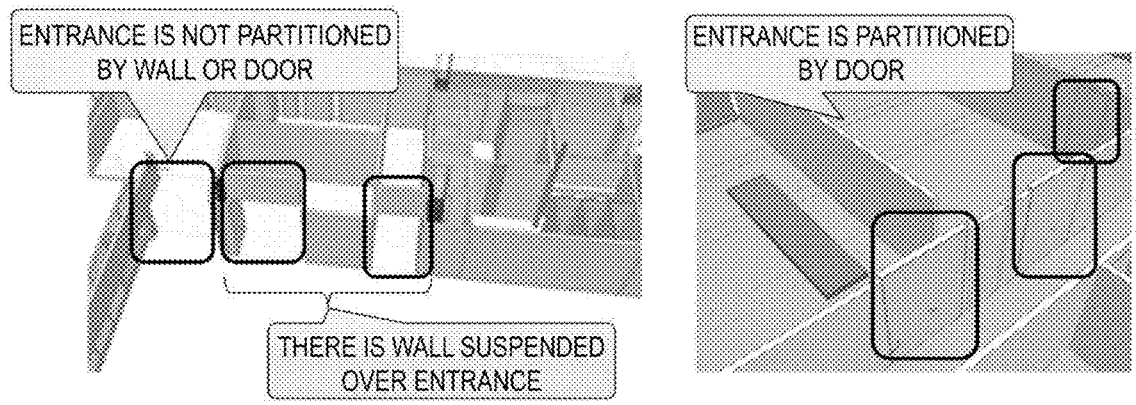
FIG. 6 is an image diagram illustrating an example of an entrance according to the embodiment of the present disclosure.

In a case where the input data is a 3D model such as BIM data, because a shape has accurate height information, removing in advance a shape (FIG. 6) not being an obstacle for movement such as a suspended wall which can be passed by a moving object present in the room is also effective to perform simplification.

Furthermore, the shape classification unit 120 stores a classification results that is a result of classifying a shape type of each target space into the classification result storage unit 130.

The classification result storage unit 130 stores classification results acquired from the shape classification unit 120.

The network data generation unit 140 generates network data including a set of links and a set of nodes based on information regarding a "room", a "passage", an "entrance", or a "floor connection" classified by the shape classification unit 120.

Specifically, the network data generation unit 140 is configured to include a link/node generation unit 142 and a connection unit 144.

Before generating a link and a node, the link/node generation unit 142 determines whether a target space can be configured of only a node or required to be configured of a link and a node based on a classification result stored in the classification result storage unit 130, and a characteristic of the target space that is a partial region of a space and is defined according to a structure of a space.

Specifically, first, the link/node generation unit 142 generates an "entrance" node connected to a "room", a "passage", or a "floor connection" with respect to a space classified as an "entrance."

In this case, attribute information (for example, attributes of the "space" include a width, a depth, a height, or the like) may be directly included in a corresponding shape in the input data.

Also, a shape does not directly include attribute information but attribute information may also be acquired by automatically extracting another shape in the vicinity or inside the shape (for example, the number of toilet bowls in a toilet) or attribute information (for example, a material of a floor surface in a space) in the input data.

In such a case, the attribute information, described above, automatically acquired is appended to a generated "entrance" node, and realization of navigation based on the appended attribute information and acquisition of useful information are achieved when route search or navigation is performed.

In a case of a "room" or a "passage" connected to two or more "entrances", a plurality of generated "entrance" nodes are present, and thus attribute information related to redundant "space" is appended to each node. Thus, in that case, an amount of data can be reduced by separately generating a POI for the "space" and appending an ID thereof to attribute information of the "entrance" nodes.

Specifically, the link/node generation unit 142 determines whether a target space is configured of a node or configured of a link and a node based on whether the target space is a "room" or a "passage", and generates a link and a node on the basis thereof.

Figure 7:
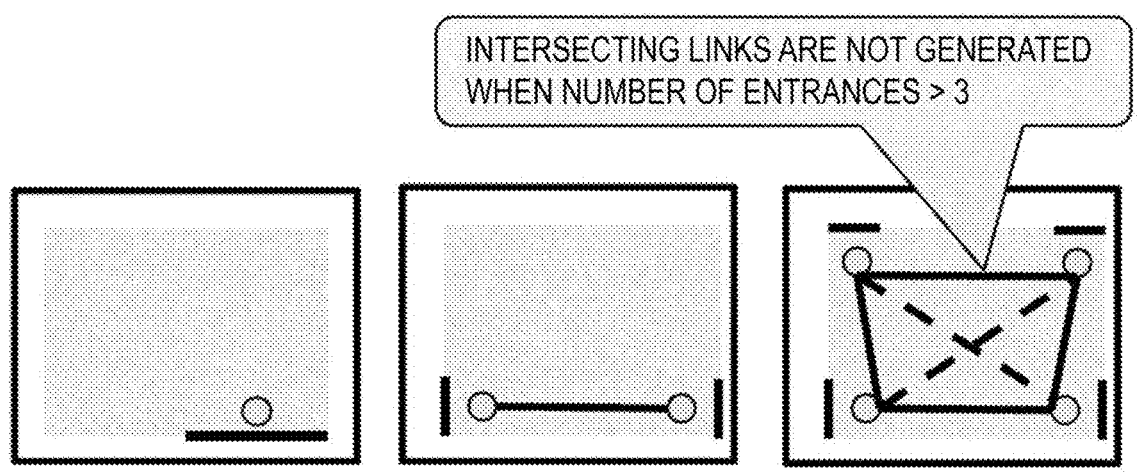
FIG. 7 is an image diagram illustrating an example of generating network data in a room according to the embodiment of the present disclosure.

For example, in a case where a target space is classified as a "room", the link/node generation unit 142 generates a link connecting nodes to each other when there are a plurality of "entrance" nodes in the "room" (FIG. 7).

Here, when the number of entrances is greater than three (the number of entrances>3) (the right part in FIG. 7), links between the nodes intersect each other. In this case, there may be a configuration in which the intersecting links are removed for the purpose of reducing an amount of network data.

In a case where a target space is classified as a "passage", the link/node generation unit 142 generates centerlines for a shape of the "passage", and generates "passage" nodes to be placed at vertices and an intersection of the centerlines. This is because, in a case of a "passage", when "entrance" nodes are simply connected to each other via a link due to a wall or the like, the link may collide with the wall or an inner frame of a perforated polygon.

Figure 8:
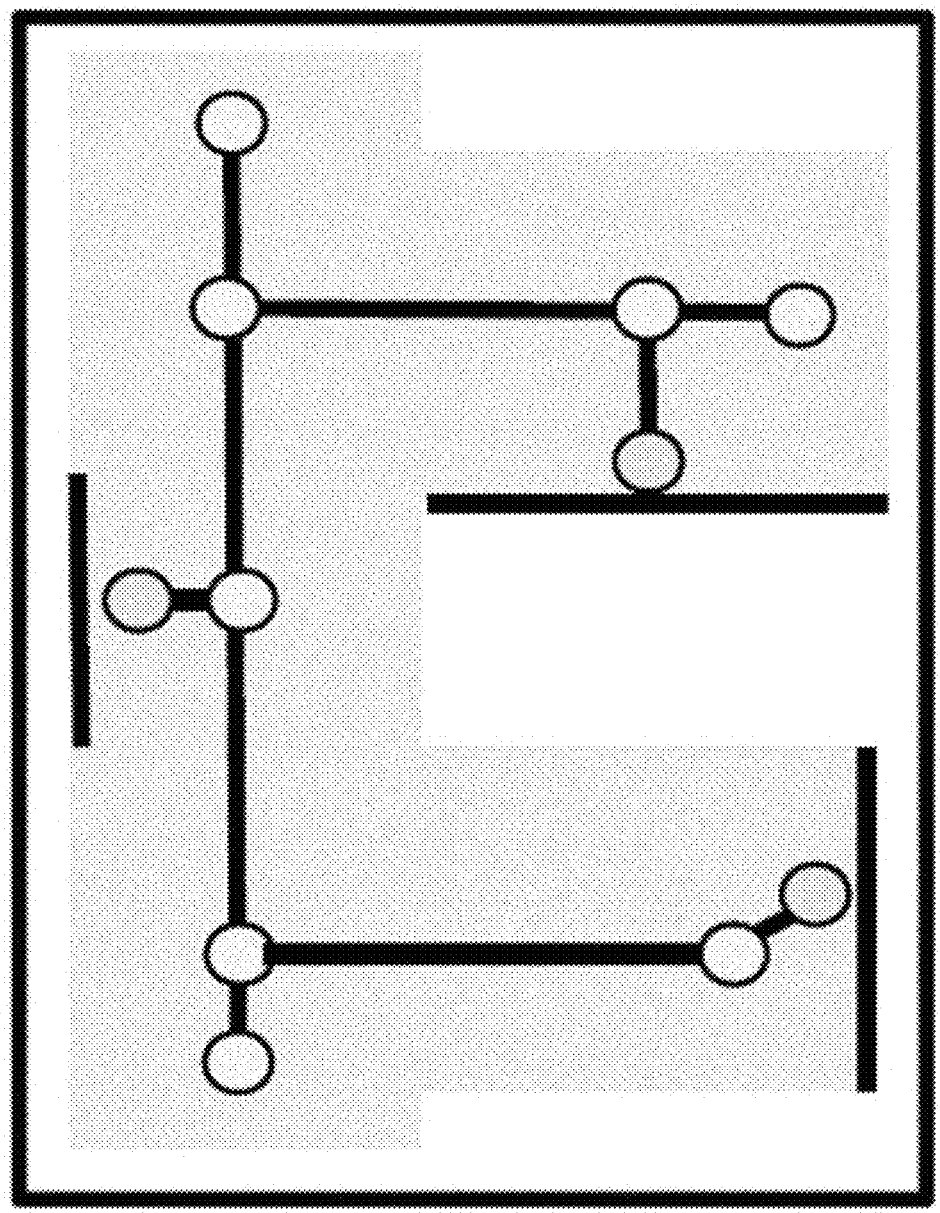
FIG. 8 is an image diagram illustrating an example of generating network data in a passage according to the embodiment of the present disclosure.
Figure 9:
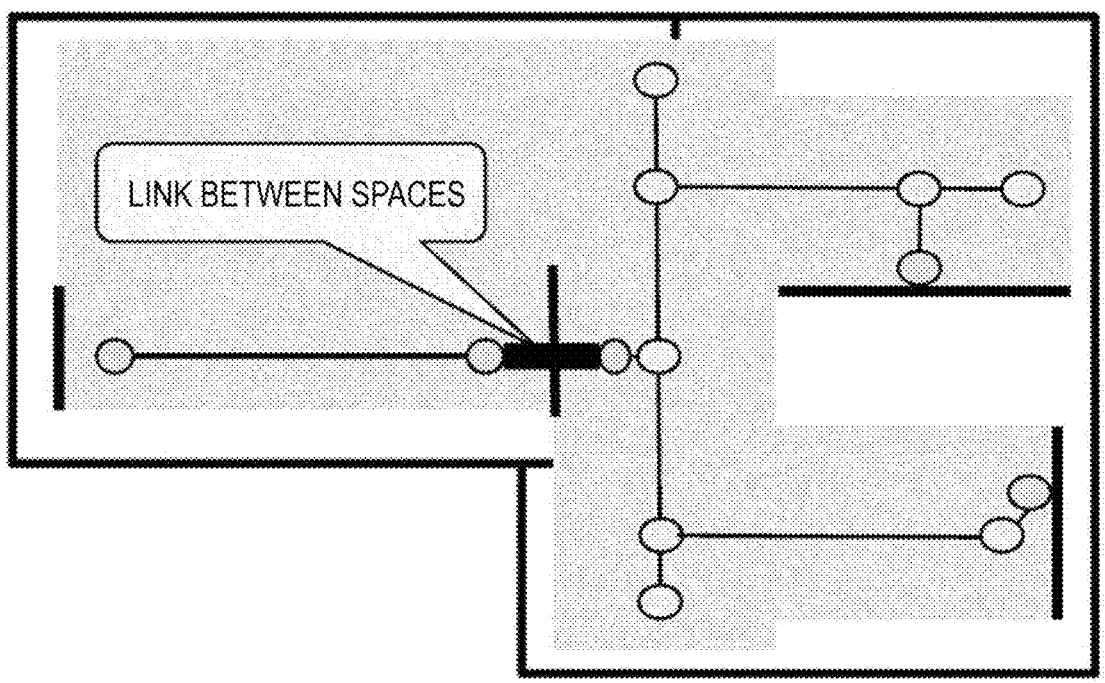
FIG. 9 is an image diagram illustrating an example of generating network data between spaces according to the embodiment of the present disclosure.
Figure 10:
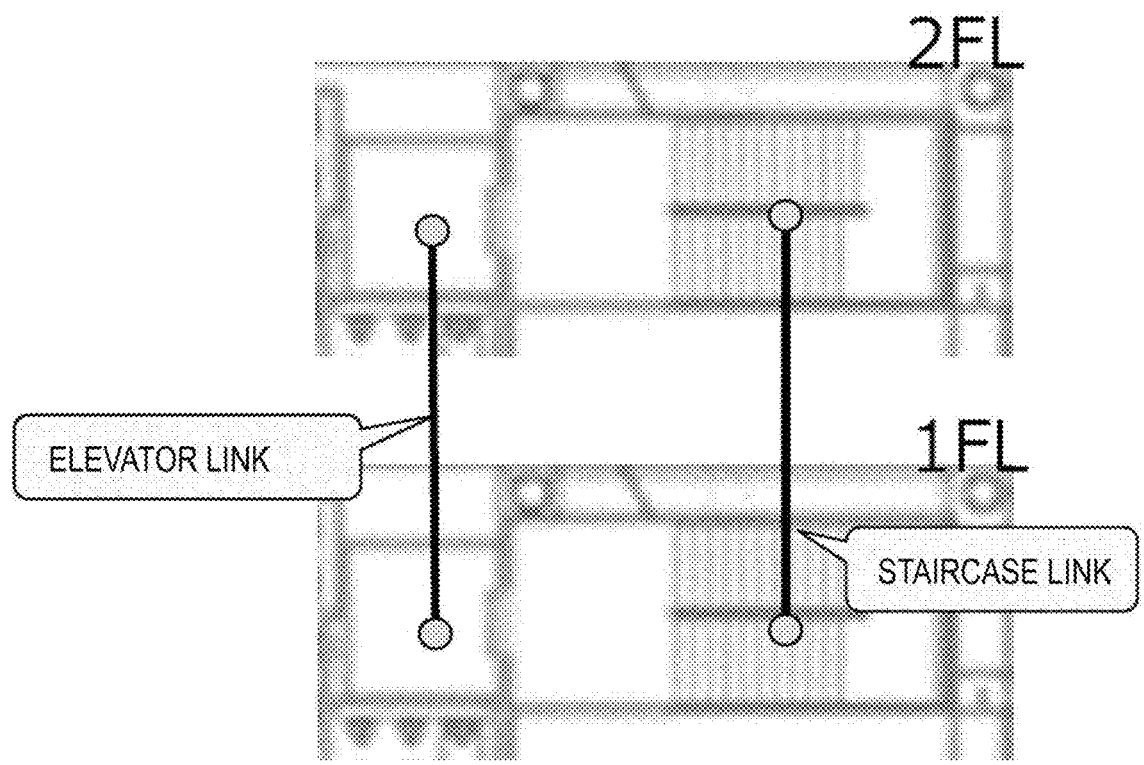
FIG. 10 is an image diagram illustrating an example of generating network data between floors according to the embodiment of the present disclosure.

Next, the link/node generation unit 142 generates "passage" links between the "passage" nodes (FIG. 8). Consequently, the "entrance" nodes are connected to the "passage" nodes or the "passage" links, and thus there is no collision with the wall or the inner frame.

Then, the link/node generation unit 142 determines whether a "passage" node or a "passage" link is present in the vicinity of an "entrance" node.

When a "passage" node is present in the vicinity of an "entrance" node, the link/node generation unit 142 generates a link connecting the "entrance" node and the "passage" node.

On the other hand, in a case where a "passage" link is present in the vicinity of an "entrance" node, the link/node generation unit 142 draws a perpendicular line from the "entrance" node to the "passage" link, and generates a node at an intersection therebetween. Then, a link is generated between the "entrance" node and the intersection node.

As mentioned above, the link/node generation unit 142 generates a set of links and a set of nodes by generating links or nodes for all target spaces.

The link/node generation unit 142 generates a centerline for a shape of a "passage" when network data relating to the "passage" is generated, a shape simplified by the shape classification unit 120 may be used for the shape when the centerline is generated. The simplified shape is used, and thus a result in which a generated centerline is also simplified can be acquired.

As a method of generating a centerline, the medial axis transform in Non-Patent Literature 1, the characteristics of the Voronoi diagram, or the like may be used (Reference 1). [Reference 1] JP 2003-132353 A The centerline acquired here may be an excessive shape (a complex line with a large number of vertices) in the passage depending on a shape of a "space". In this case, the line may be simplified by using a Ramer-Douglas-Peucker (point decimation) algorithm, a process of thinning out nodes in the generated network (Reference 2) or the like. [Reference 2] JP 2015-210626 A The connection unit 144 connects nodes to each other via a link based on a generated set of nodes and a generated set of links, and information corresponding to an entrance.

Specifically, for each "floor", the connection unit 144 generates an "entrance" link that connects "entrance" nodes for the same "entrance" to each other in order to connect "spaces" to each other. In this case, in a case where information such as a width, a height, and a height of a step can be acquired from a shape and attribute information of an "entrance" in the input data, useful information can be acquired when route search or navigation is performed, by setting the information as attribute information of an "entrance" link.

The connection unit 144 generates a "floor connection" link that connects "floor connection" nodes for the same "floor connection" to each other in order to connect floors to each other. In this case, attribute information (for example, attributes of a "staircase" includes the number of steps, a height of a step or the like) may be directly included in a corresponding shape in the input data. Also, a shape does not directly include attribute information, but attribute information may also be acquired by automatically extracting another shape in the vicinity or inside the shape (for example, the presence or absence of a handrail in a staircase) or attribute information (for example, a height of a "space" where a staircase is present) in the input data.

In such a case, the attribute information automatically acquired as described above is appended to a generated "entrance" node, and realization of navigation based on the appended attribute information and acquisition of useful information are achieved when route search or navigation is performed.

Also, in a case where a node or a link is connected to outdoor network data, the connection unit 144 may connect the node or the link to the outdoor network data.

The connection unit 144 stores all of generated nodes and all of generated links as network data into the network data storage unit 150.

The network data storage unit 150 stores network data generated by the network data generation unit 140.

The output unit 160 outputs the network data stored in the network data storage unit 150.

Figure 11:
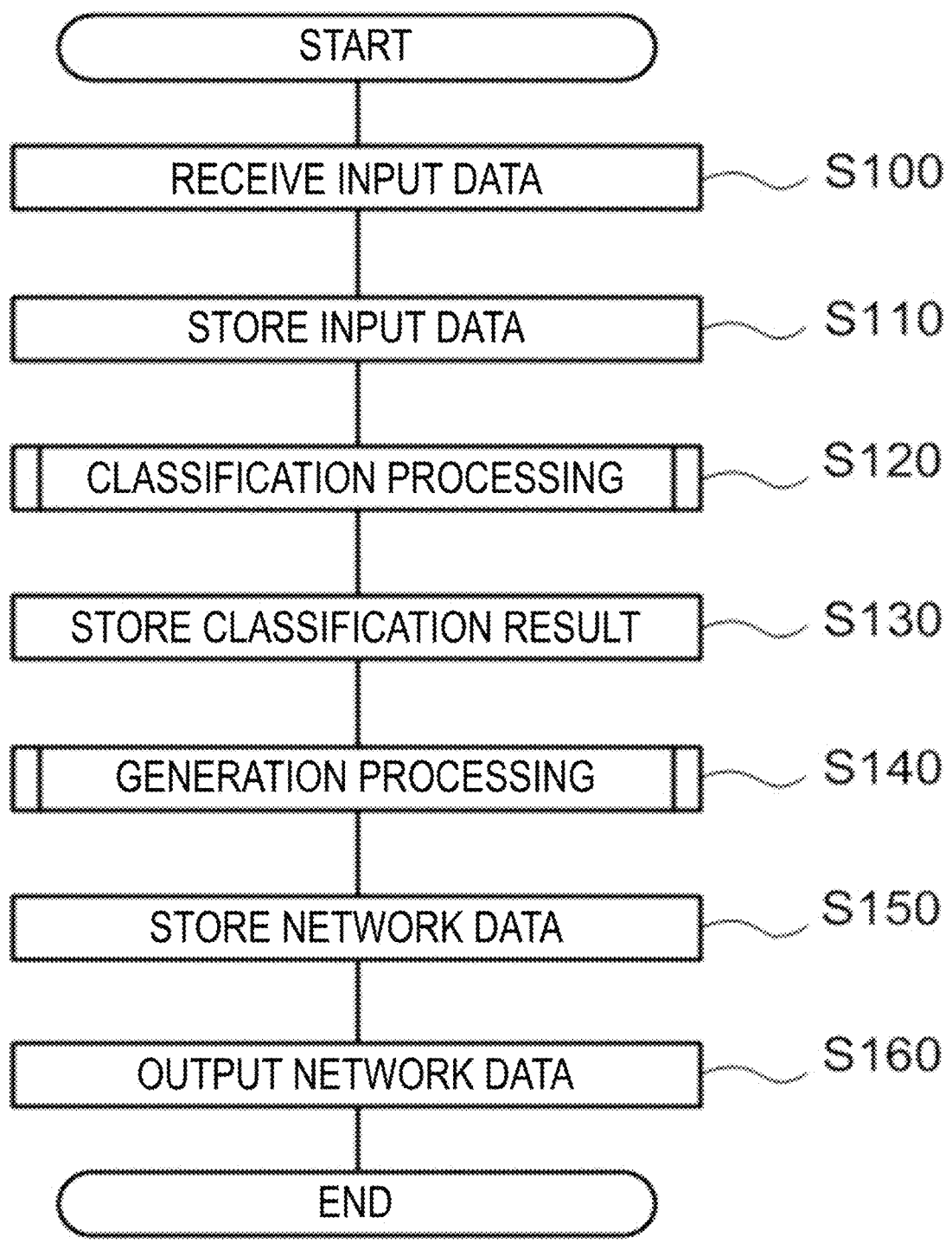
FIG. 11 is a flowchart illustrating a network data generation processing routine according to the embodiment of the present disclosure.

Operation of Network Data Generation Device According to Embodiment of Present Disclosure FIG. 11 is a flowchart illustrating a network data generation processing routine according to the embodiment of the present disclosure.

When input data is input to the input unit 100, the network data generation processing routine illustrated in FIG. 11 is performed in the network data generation device 10.

First, in step S100, the input unit 100 receives input of input data including at least a structure of an indoor space and information indicating a property based on the structure of the indoor space.

In step S110, the input data received in step S100 is stored into the indoor spatial data storage unit 110.

In step S120, the shape classification unit 120 classifies a shape type of each target space as a "room", a "passage", an "entrance", or a "floor connection" from the input data.

In step S130, a classification result acquired in step S120 is stored into the classification result storage unit 130.

In step S140, the network data generation unit 140 generates a set of links and a set of nodes from indoor spatial data and the classification result, and generates network data.

In step S150, the network data generated in step S140 is stored into the network data storage unit 150.

In step S160, the output unit 160 outputs the network data stored in the network data storage unit 150.

Figure 12:
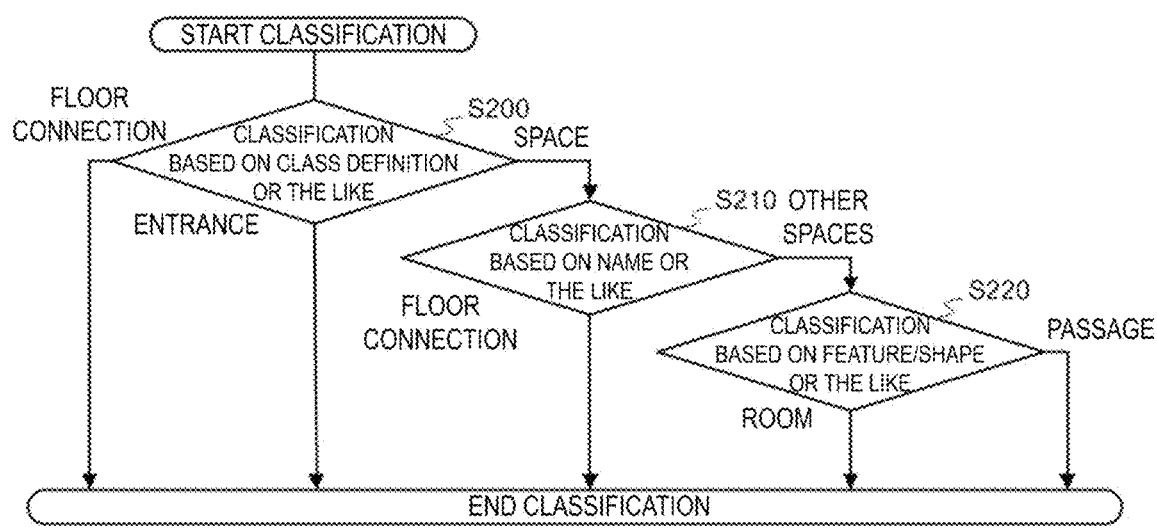
FIG. 12 is a flowchart illustrating a classification processing routine according to the embodiment of the present disclosure.

Here, the classification processing in step S120 will be described with reference to FIG. 12. FIG. 12 is a flowchart illustrating a classification processing routine.

In step S200, the shape classification unit 120 classifies a shape type of each target space as a "floor connection", an "entrance", or a "space" according to class definition or a layer (determination method 1).

In step S210, the shape classification unit 120 classifies a shape type of each target space as a "floor connection" or a "space" based on a name, an attribute or the like that are appended to each shape in the input data (determination method 2).

In step S220, the shape classification unit 120 classifies a shape type of each target space as a "room" or a "passage" according to a characteristic of a target space defined on the basis of a structure of a space.

Figure 13:
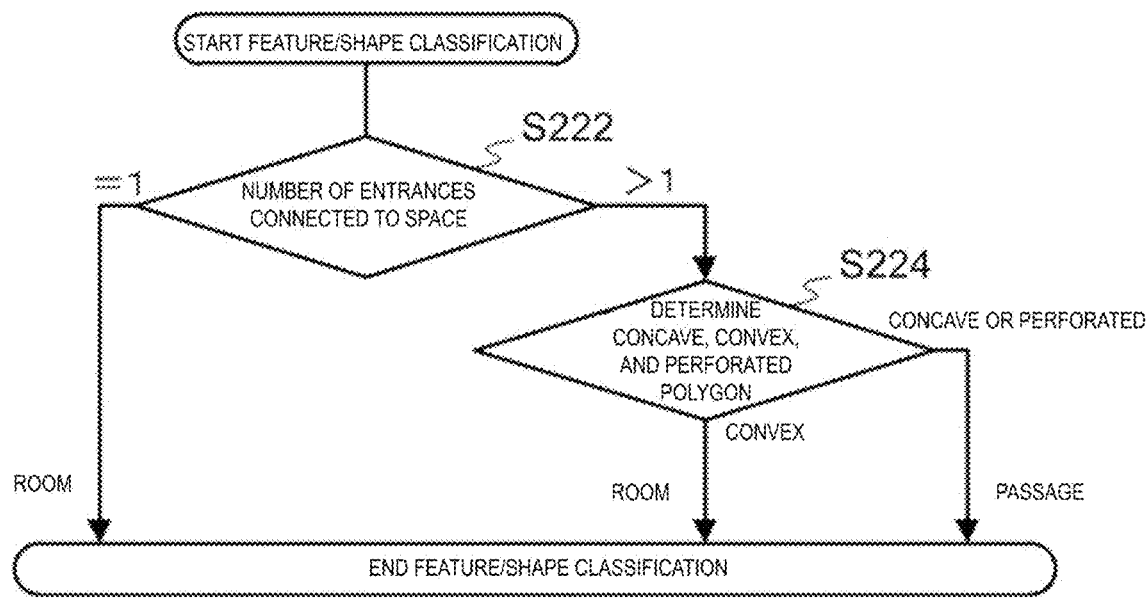
FIG. 13 is a flowchart illustrating a feature/shape classification processing routine according to the embodiment of the present disclosure.

Here, the feature/shape classification in step S220 will be described with reference to FIG. 13. FIG. 13 is a flowchart illustrating a feature/shape classification processing routine.

In step S222, the shape classification unit 120 focuses on the number of "entrances" of a target space classified as a "space", and determines and classifies a shape type of the "space" as a "room" in a case where the number of "entrances" is one (=1 in step S222). On the other hand, in a case where the number of "entrances" is greater than one (>1 in step S222), it is determined whether the shape type is a "room" or a "passage" from information such as a shape, a width, and a depth of the "space", and the flow proceeds to step S224.

In step S224, the shape classification unit 120 focuses on a shape of the "space", and determines and classifies a shape type of the "space" as a "room" in a case where the shape is a convex polygon (convex in step S224), and determines and classifies a shape type of the "space" as a "passage" in a case where the shape is a concave or perforated (with holes) polygon (concave or perforated in step S224).

Figure 14:
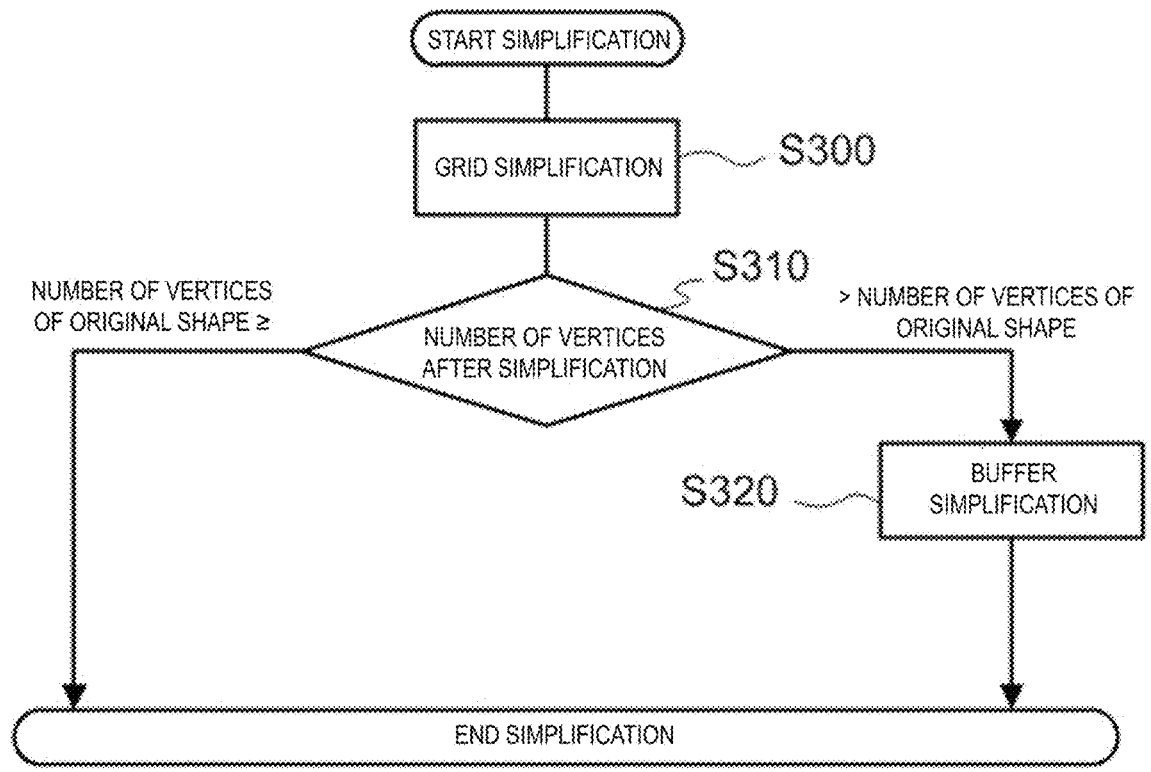
FIG. 14 is a flowchart illustrating a spatial shape simplification processing routine according to the embodiment of the present disclosure.

Here, before step S222 is performed, it is determined whether a shape of a target space classified as a "space" is complex, and in a case where the shape is complex, it is preferable to simplify a complex shape and then determine whether the shape is a convex polygon shape, a concave polygon shape, or a perforated polygon shape. Therefore, in a case where a shape of a target space classified as the "space" is complex, spatial shape simplification processing illustrated in FIG. 14 is performed. FIG. 14 is a flowchart illustrating spatial shape simplification processing.

In step S300, the shape classification unit 120 divides a rectangle circumscribed to a shape of a target space classified as a "space" into small grids that are horizontal and vertical (the grid has a size sufficient for a moving object to be able to move). A set of grids in which the grids and an original shape overlap each other is used as a shape of a space after simplification, and thus the shape of the space is simplified.

In step S310, the shape classification unit 120 determines whether the number of vertices of the shape of the "space" after simplification in step S300 is greater than the number of vertices of the original shape.

In a case where the number of vertices of the shape of the "space" after simplification is greater than the number of vertices of the original shape (>the number of vertices of the original shape in step S310), in step S320, the shape classification unit 120 simplifies the shape by generating a buffer that expands the shape with respect to the shape of the "space" (the buffer has a size sufficient for a moving object to be able to move) and then by generating a buffer that contracts the shape (the buffer has the same value as that of the expanding buffer).

Figure 15:
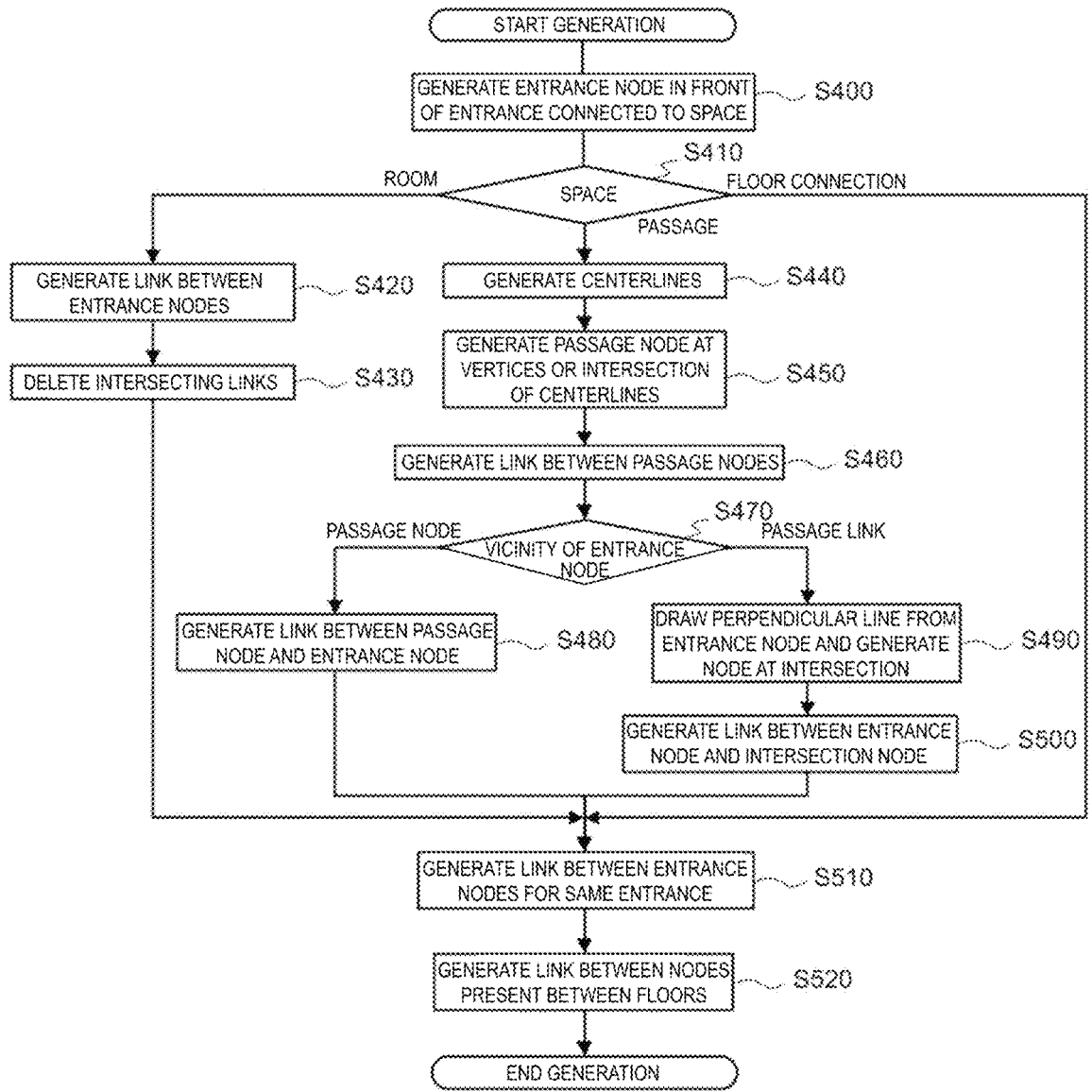
FIG. 15 is a flowchart illustrating a generation processing routine according to the embodiment of the present disclosure.

The generation processing in step S140 will now be described with reference to FIG. 15. FIG. 15 is a flowchart illustrating a generation processing routine.

In step S400, the link/node generation unit 142 generates "entrance" nodes connected to a "room", a "passage", and a "floor connection" in front of a target space classified as an "entrance".

In step S410, the link/node generation unit 142 determines whether a target "space" is a "room", a "passage", or a "floor connection".

In a case where the "space" is a "room" (room in step S410), in step S420, the link/node generation unit 142 generates an "entrance" link connecting "entrance" nodes to each other when there are a plurality of "entrance" nodes in the "room".

In step S430, in a case where the number of entrances is greater than three, the link/node generation unit 142 removes intersecting links and proceeds to step S510.

When the target "space" is a "passage" (passage in step S410), the link/node generation unit 142 generates centerlines for a shape of the "passage" in step S440.

In step S450, the link/node generation unit 142 generates "passage" nodes at vertices or an intersection of the centerlines generated in step S440.

In step S460, the link/node generation unit 142 generates a "passage" link between the "passage" nodes.

In step S470, the link/node generation unit 142 determines whether a "passage" node or a "passage" link is present in the vicinity of an "entrance" node.

In a case where a "passage" node is present in the vicinity of an "entrance" node (passage node in step S470), in step S480, the link/node generation unit 142 generates a link connecting the "entrance" node to the "passage" node, and proceeds to step S510.

On the other hand, in a case where a "passage" link is present in the vicinity of an "entrance" node (passage link in step S470), in step S490, link/node generation unit 142 draws a perpendicular line from the "entrance" node to the "passage" link and generates a node at an intersection therebetween.

In step S500, the link/node generation unit 142 generates a link between an "entrance" node and an intersection node, and proceeds to step S510.

In a case where the target "space" is a "floor connection" (floor connection in step S410), the flow proceeds to step S510.

In step S510, the connection unit 144 connects "entrance" nodes for the same entrance to each other via an "entrance" link.

In step S520, the connection unit 144 generates a "floor connection" link that connects "floor connection" nodes for the same "floor connection" to each other, in order to connect floors to each other.

As described above, according to the network data generation device related to the embodiment of the present disclosure, it is determined, with respect to input data including at least a structure of the indoor space and information indicating a property based on the structure of the indoor space whether a target space that is a partial region of an indoor space is a room or a passage. A set of links and a set of nodes are generated on the basis of a determination result, whereby appropriate network data for an indoor map can be efficiently generated from input data including the structure of the indoor space.

The present disclosure is not limited to the embodiment described above, and various modifications and applications can be made without departing from the gist of the present disclosure.

In the present specification, the program has been described as an embodiment in which the program is installed in advance but the program may be stored in a computer readable recording medium to be provided.

REFERENCE SIGNS LIST

10 NETWORK DATA GENERATION DEVICE
100 INPUT UNIT
110 INDOOR SPATIAL DATA STORAGE UNIT
120 SHAPE CLASSIFICATION UNIT
130 CLASSIFICATION RESULT STORAGE UNIT
140 NETWORK DATA GENERATION UNIT
142 LINK/NODE GENERATION UNIT
144 CONNECTION UNIT
150 NETWORK DATA STORAGE UNIT
160 OUTPUT UNIT

The invention claimed is:

1. A computer-implemented method for generating two-dimensional network data of aspects of three-dimensional spaces, the method comprising:
receiving structure data of a three-dimensional indoor space and information on characteristics based on the structure data of the three-dimensional indoor space, wherein the three-dimensional indoor space includes a plurality of spaces, and the plurality of spaces includes a first space and a second space, and the first space is adjacent to the second space;
identifying, by a processor, based on the received structure data and the information on characteristics of the three-dimensional indoor space, first shape data of the first space as a convex polygon;
determining, by the processor, based on the identified first shape data of the first space as the convex polygon, a first type of the first space as a room type;

automatically generating, by the processor, based on the determined first type of the first space as the room type and further based on a number of entrance nodes adjacent to the first space, a first node and a first link both associated with the first space, wherein the first link connects an entrance node and the first node;

identifying, by the processor, based on the received structure data and the information on characteristics of the three-dimensional indoor space, second shape data of the second space as a concave polygon;

determining, by the processor, based on the identified second shape data of the second space as the concave polygon, a second type of the second space as a passage type;

automatically generating, by the processor, based on the identified concave polygon associated with the second shape data of the second space determined as the passage type, a second node and a second link, wherein the second node is at a vortex of a centerline in the identified concave polygon, and wherein the second link connects the first node and the second node; and automatically generating, by the processor, based at least on a combination including the entrance node, the first node, the second node, the first link, and the second link, the two-dimensional network data of the three-dimensional indoor space, wherein the first link indicates a first movable space between the entrance node as a starting point and the first node in the first space of the room type on a map, and the second link indicates a second movable space between the first node in the first space and the second node in the second space of the passage type on the map.

2. The computer-implemented method of claim 1, the method further comprising:

determining, based on a characteristic of the space, whether the space as defined by the structure data of the indoor space is configurable by a node only or by a combination of links and one or more nodes; and generating at least one node based on the determined space definition.

3. The computer-implemented method of claim 2, wherein the characteristic of the space includes at least one of:

a number of entrances; and visibility information indicating whether substantially all of regions in the space are visible from a view point in the space for being configurable by one node only.

4. The computer-implemented method of claim 3, the method further comprising:

when a shape of the space is a convex polygon shape, determining the visibility information as the substantially all of regions in the space being visible from the view point in the space; and determining the space to be configured by one node only.

5. The computer-implemented method of claim 4, the method further comprising:

simplifying the shape of the space by reducing a number of vertices; and determining, based on the simplified shape of the space, whether the shape of the space is a convex polygon shape.

6. The computer-implemented method of claim 1, the method further comprising:

receiving an entrance as a type of the space, wherein the entrance connects a plurality of spaces on a floor without a wall; and connecting, based on information about the entrance as the received type of the space, a first set of generated nodes and a second set of generated links in the network data.

7. The computer-implemented method of claim 1, wherein the information on characteristics based on the structure data of the indoor space includes:

direct characteristic information for determining whether the space is representable by a link or a node directly from the structure data of the indoor space, and indirect characteristic information for determining whether the space is representable by a link or a node by analyzing a shape of the space.

8. A system for generating two-dimensional network data of aspects of three-dimensional spaces, the system comprising:

a processor; and a memory storing computer-executable instructions that when executed by the processor cause the system to:

receive structure data of a three-dimensional indoor space and information on characteristics based on the structure data of the three-dimensional indoor space, wherein the three-dimensional indoor space includes a plurality of spaces, the plurality of spaces includes a first space and a second space, and the first space is adjacent to the second space;

identifying, by a processor, based on the received structure data and the information on characteristics of the three-dimensional indoor space, first shape data of the first space as a convex polygon;

determining, by the processor, based on the identified first shape data of the first space as the convex polygon, a first type of the first space as a room type;

automatically generating, based on the determined first type of the first space as the room type and further based on a number of entrance nodes adjacent to the first space, a first node and a first link both associated with the first space, wherein the first link connects an entrance node and the first node;

identifying, by the processor, based on the received structure data and the information on characteristics of the three-dimensional indoor space, second shape data of the second space as a concave polygon;

determining, by the processor, based on the identified second shape data of the second space as the concave polygon, a second type of the second space as a passage type;

automatically generating, by the processor, based on the identified concave polygon associated with the second shape data of the second space determined as the passage type, a second node and a second link, wherein the second node is at a vortex of a centerline in the identified concave polygon, and wherein the second link connects the first node and the second node; and automatically generate, by the processor, based at least on a combination including the entrance node, the first node, the second node, the first link, and the second link, the two-dimensional network data of the three-dimensional indoor space, wherein the first link indicates a first movable space between the entrance node as a starting point and the first node in the first space of the room type on a map, and the second link indicates a second movable space between the first node in the first space and the second node in the second space of the passage type on the map.

9. The system of claim 8, the computer-executable instructions when executed further causing the system to:
  determine, based on a characteristic of the space, whether the space as defined by the structure data of the indoor space is configurable by a node only or by a combination of links and one or more nodes; and
  generate at least one node based on the determined space definition.

10. The system of claim 9, wherein the characteristic of the space includes at least one of:
  a number of entrances; and
  visibility information indicating whether substantially all of regions in the space are visible from a view point in the space for being configurable by one node only.

11. The system of claim 10, the computer-executable instructions when executed further causing the system to:
  when a shape of the space is a convex polygon shape, determine the visibility information as the substantially all of regions in the space being visible from the view point in the space; and
  determine the space to be configured by one node only.

12. The system of claim 11, the computer-executable instructions when executed further causing the system to:
  reduce a number of vertices of the shape of the space for simplifying the shape of the space; and
  determine, based on the simplified shape of the space, whether the shape of the space is a convex polygon shape.

13. The system of claim 8, the computer-executable instructions when executed further causing the system to:
  receive an entrance as a type of the space, wherein the entrance connects a plurality of spaces on a floor without a wall; and
  connect, based on information about the entrance as the received type of the space, a first set of generated nodes and a second set of generated links in the network data.

14. The system of claim 8, wherein the information on characteristics based on the structure data of the indoor space includes:
  direct characteristic information for determining whether the space is representable by a link or a node directly from the structure data of the indoor space, and
  indirect characteristic information for determining whether the space is representable by a link or a node by analyzing a shape of the space.

15. A computer-readable non-transitory recording medium storing computer-executable instructions that when executed by a processor cause a computer system to:
  receive structure data of a three-dimensional indoor space and information on characteristics based on the structure data of the three-dimensional indoor space, wherein the three-dimensional indoor space includes a plurality of spaces, the plurality of spaces includes a first space and a second space, and the first space is adjacent to the second space;
  identifying, by a processor, based on the received structure data and the information on characteristics of the three-dimensional indoor space, first shape data of the first space as a convex polygon;
  determining, by the processor, based on the identified first shape data of the first space as the convex polygon, a first type of the first space as a room type;
  automatically generating, based on the determined first type of the first space as the room type and further based on a number of entrance nodes adjacent to the first space, a first node and a first link both associated with the first space, wherein the first link connects an entrance node and the first node;
  identifying, by the processor, based on the received structure data and the information on characteristics of the three-dimensional indoor space, second shape data of the second space as a concave polygon;
  determining, by the processor, based on the identified second shape data of the second space as the concave polygon, a second type of the second space as a passage type;
  automatically generating, by the processor, based on the identified concave polygon associated with the second shape data of the second space determined as the passage type, a second node and a second link, wherein the second node is at a vortex of a centerline in the identified concave polygon, and wherein the second link connects the first node and the second node; and
  automatically generate, by the processor, based at least on a combination including the entrance node, the first node, the second node, the first link, and the second link, two-dimensional network data of the three-dimensional indoor space, wherein the first link indicates a first movable space between the entrance node as a starting point and the first node in the first space of the room type on a map, and the second link indicates a second movable space between the first node in the first space and the second node in the second space of the passage type on the map.

16. The computer-readable non-transitory recording medium of claim 15, the computer-executable instructions when executed further causing the system to:
  determine, based on a characteristic of the space, whether the space as defined by the structure data of the indoor space is configurable by a node only or by a combination of links and one or more nodes; and
  generate at least one node based on the determined space definition.

17. The computer-readable non-transitory recording medium of claim 16, wherein the characteristic of the space includes at least one of:
  a number of entrances; and
  visibility information indicating whether substantially all of regions in the space are visible from a view point in the space for being configurable by one node only.

18. The computer-readable non-transitory recording medium of claim 17, the computer-executable instructions when executed further causing the system to:
  when a shape of the space is a convex polygon shape, determine the visibility information as the substantially all of regions in the space being visible from the view point in the space; and
  determine the space to be configured by one node only.

19. The computer-readable non-transitory recording medium of claim 18, the computer-executable instructions when executed further causing the system to:
  reduce a number of vertices of the shape of the space for simplifying the shape of the space; and
  determine, based on the simplified shape of the space, whether the shape of the space is a convex polygon shape.

20. The computer-readable non-transitory recording medium of claim 15, the computer-executable instructions when executed further causing the system to:
  receive an entrance as a type of the space, wherein the entrance connects a plurality of spaces on a floor without a wall; and connect, based on information about the entrance as the received type of the space, a first set of generated nodes and a second set of generated links in the network data.

* * * * *